March 12, 1963 I. W. SANDBERG 3,081,434
MULTIBRANCH CIRCUITS FOR TRANSLATING
FREQUENCY CHARACTERISTICS Filed April 18, 1960 2 Sheets-Sheet 1

INVENTOR
I. W. SANDBERG
BY R.O. Nimz
ATTORNEY

PRODUCT MODULATOR

INVENTOR
I. W. SANDBERG
BY R. O. Nimtz
ATTORNEY

United States Patent Office 3,081,434

Patented Mar. 12, 1963

3,081,434

MULTIBRANCH CIRCUITS FOR TRANSLATING FREQUENCY CHARACTERISTICS

Irwin W. Sandberg, Springfield, N.J., assignor to Bell Telephone Laboratories, Incorporated, New York, N.Y., a corporation of New York Filed Apr. 18, 1960, Ser. No. 22,965
18 Claims. (Cl. 328—22)

This invention relates to time-varying networks and, more particularly, to the synthesis of transducer characteristics by means of time-varying networks.

It is an object of the present invention to generate frequency dependent characteristics having unique properties by using time-varying networks.

It is a more specific object of this invention to provide band-pass and band-elimination transmission characteristics without the use of inductor elements.

It is another object of the invention to synthesize electronically controllable filter characteristics.

It is a further object of the invention to economically synthesize impedances which are difficult or even impossible to obtain with lumped elements.

These and other objects are realized in the present invention by utilizing time-varying networks to translate the frequency characteristics of simple passive networks to any frequency range or ranges desired. More particularly, a plurality of identical linear networks are operated between input and output modulators which are connected in parallel. All of the input and output modulating signals are periodic and are related to each other by fixed time delays. The transfer function of the overall network with this arrangement is similar to the transfer function of the individual linear networks but centered around the modulating frequency rather than zero frequency.

With the arrangement described above, low-pass and high-pass filter characteristics, which can be obtained with simple resistance-capacitance networks, are transformed into band-pass and band-elimination characteristics. It has often been found desirable to obtain narrow-band characteristics without the use of inductors, particularly at very low frequencies where high quality inductors of sufficiently high value can be obtained only with large and expensive magnetic structures. The present invention makes this possible.

It is similarly possible to synthesize impedance functions rather than transfer functions by connecting the modulators in a closed loop including the elementary linear networks. With this arrangement, many impedance functions difficult, or even impossible, to obtain with lumped elements can be economically synthesized and combined with other passive circuit elements to form useful transducers.

One major advantage of the synthesizing networks of the present invention is the ease with which their characteristics can be controlled. Simple controls for the frequency, amplitude and waveform of the modulating signals, which can be implemented electronically, serve to control the parameters of the resulting transfer or impedance functions.

These and other objects and features, the nature of the present invention and its various advantages, will be more readily understood upon consideration of the attached drawings and of the following detailed description of the drawings.

Figure 1:
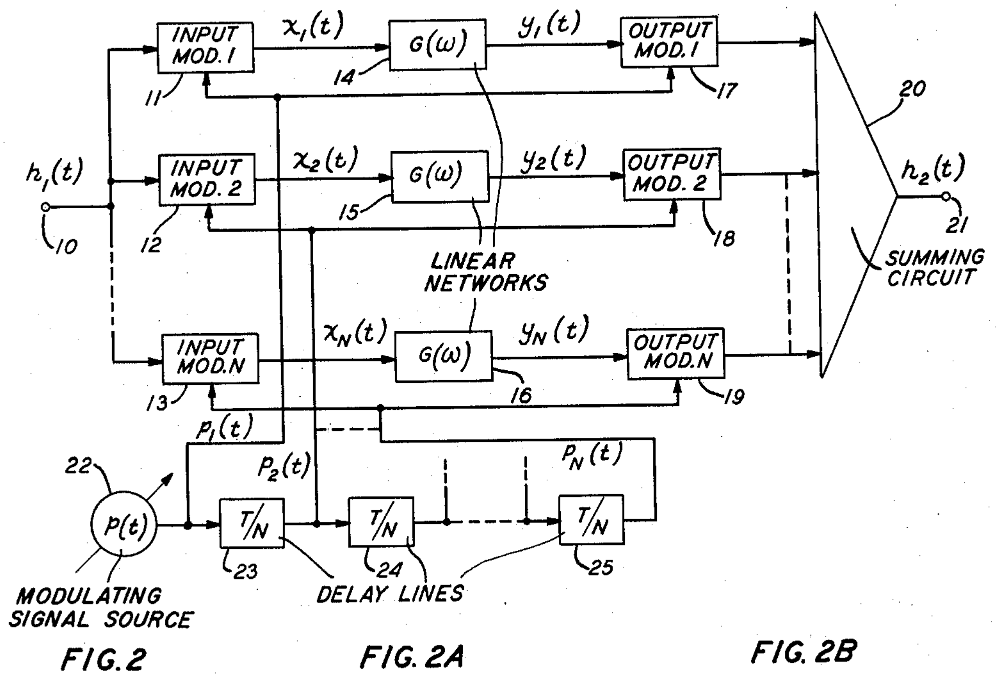
FIG. 1 is a schematic block diagram of a time-varying network in accordance with the present invention.
Figure 2:
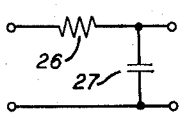
FIGS. 2, 3 and 4 illustrate typical lumped constant circuits useful in the network of FIG. 1.
Figure 2A:
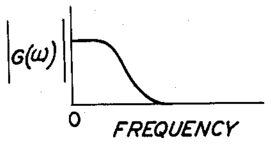
Figure 2B:
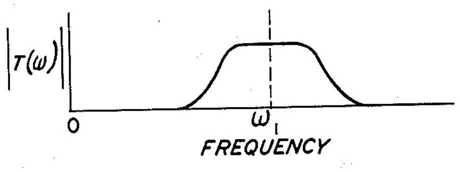
Figure 3:
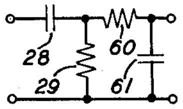
Figure 3A:
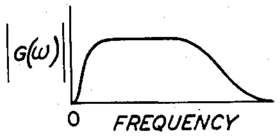
Figure 3B:
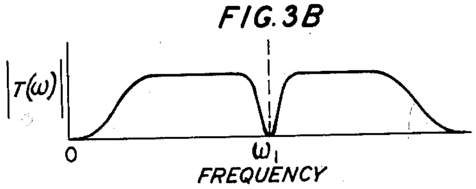
Figure 4:
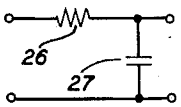
Figure 4A:
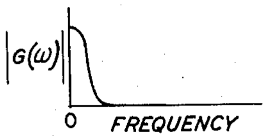
Figure 4B:
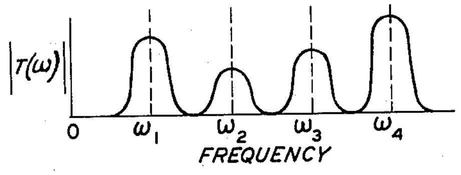
Figure 5:
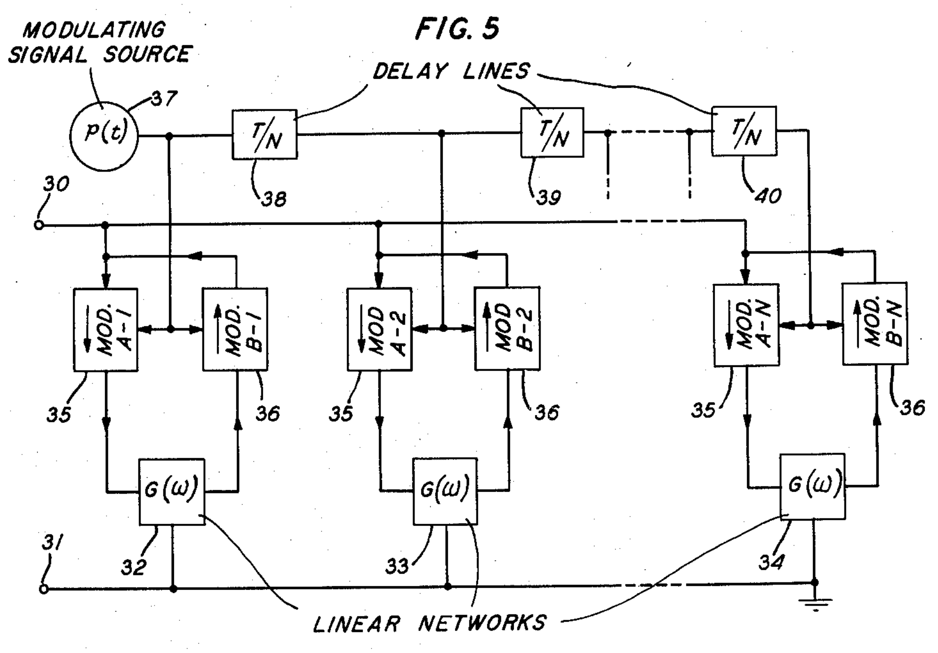
Figure 6:
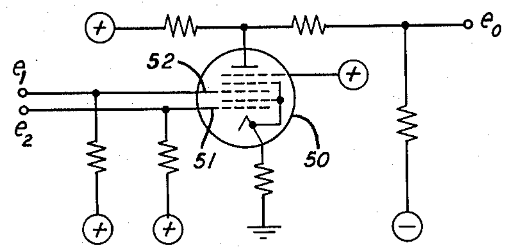

FIGS. 2A, 3A, and 4A are graphical representations of the transmission characteristics of the circuits of FIGS. 2, 3, and 4, respectively;

FIGS. 2B, 3B, and 4B are graphical representations of the over-all transmission characteristics of the network of FIG. 1 in which the circuits of FIGS. 2, 3, and 4, respectively, are inserted and other parameters suitably adjusted;

FIG. 5 is a schematic block diagram of an impedance synthesizing network using time-varying techniques in accordance with the invention; and FIG. 6 is a schematic diagram of a product modulator useful in the circuits of FIGS. 1 and 5.

Referring more particularly to FIG. 1, there is shown a schematic block diagram of a time-varying network in accordance with the present invention having an input terminal 10 to which an input signal $h_1(t)$ is applied. The signal $h_1(t)$ is applied to a bank of N input modulators 11, 12, . . . 13. Each of modulators 11 through 13 is a product modulator, i.e., their outputs are proportional to the instantaneous product of the input signal $h_1(t)$ and a modulating signal $p(t)$. The output of each of modulators 11 through 13 is applied to one of N elementary signal transmission networks or transducers 14, 15, . . . 16, each of which has been characterized by the same transfer function $G(\omega)$. The networks 14 through 16 are all substantially identical, are simple, linear, passive networks, preferably consisting of only simple resistances and capacitances, and will be more fully described below.

The output of each of networks 14 through 16 is applied to one of a bank of N output modulators 17, 18, . . . 19. Each of modulator circuits 17 through 19 is similar to each of input modulators 11 through 13, i.e., each produces an output signal proportional to the instantaneous product of the signal input from one of networks 14 through 16 and the modulating signal $p(t)$.

The outputs of modulators 17 through 19 are each applied to an N input summing circuit 20. Summing circuit 20 may, for example, comprise a simple summing amplifier, or even a passive summing network, provided an increased signal level is not required. The output of summing circuit 20, appearing at terminal 21, is proportional to the sum of the N inputs and has been identified as $h_2(t)$.

Modulating signals for each of the modulators 11 through 13 and 17 through 19 are derived from a modulating signal source 22 which has been characterized as generating the signal $p(t)$. The signal $p(t)$ may comprise any periodic wave, but in the preferred embodiments comprises a sine wave or a simple combination of two or more sine waves. The output of generator 22 is applied to a delay line segment 23, the output of which is applied to a second delay line segment 24, and so forth, to an $(N-1)$st delay line segment 25. Each of delay lines 23 through 25 produces an equal delay which is expressed by the quotient T/N, where T is the period of $p(t)$ and N is the number of networks 14, 15, . . . 16. The output of generator 22 provides the modulating signal $p_1(t)$ for modulators 11 and 17. Similarly, the output of delay network 23 provides the modulating signal $p_2(t)$ for modulators 12 and 18 and the output of delay network 25 provides the modulating signal $p_N(t)$ for modulators 13 and 19.

From the above description, it can be seen that the input signal $h_1(t)$ is modulated N times by the modulating signal $p(t)$ where the modulating signal is displaced by a fixed time delay equal to $T/N$ between successive ones of the N input modulators. Each of these N modulated signals is applied to an elementary two-port network characterized by the transfer function $G(\omega)$. After being subjected to the transmission characteristic $G(\omega)$, each of these modulated signals is applied to an output modulator circuit, and therein modulated with the same modulating signal as in the input modulator. The outputs of all of these output modulators are then combined by simple addition to produce the output signal. A mathematical analysis of the circuit of FIG. 1 provides a useful expression of the transfer function of the entire circuit.

The time functions $h_1(t)$, $h_2(t)$ and $x_n(t)$ and $y_n(t)$ may be interpreted to be either voltages or currents. The input modulators 11, 12, . . . 13 operate on the input function $h_1(t)$ to produce the inputs $x_n(t)$ to the N linear, lumped-constant, time-invariant networks 14, 15, . . . 16. The outputs $y_n(t)$ from networks 14, 15, . . . 16 are operated upon in the output modulators 17, 18, . . . 19 and combined in summing circuit 20 to produce the final output $h_2(t)$.

Assume for the purposes of simplicity that the periodic function $p(t)$ is a simple sine function expressed by $$p(t)=A\sin(\omega_1 t+\theta) \tag{1}$$

It is convenient to define the function $$p_n(t)=p[t-(n-1)\tau] \tag{2}$$

where $\tau$ is the time displacement produced by each of the delay networks 23, 24, . . . 25, i.e., $$\tau=\frac{T}{N}$$

where $$T=2\pi/\omega_1$$

Since modulators 11, 12, . . . 15 have been specified as product modulators, we may write $$x_n(t)=p_n(t)h_1(t) \tag{3}$$

Transforming the expressions in Equations 1 and 2 for convenience to the frequency domain, Equation 3 may be written $$X_n(\omega)=H_1(\omega)*P_n(\omega) \tag{4}$$

where the time function and its Fourier transform are denoted, in accordance with the usual notation, by lower and upper case letters, respectively.

It is clear that $$Y_n(\omega)=X_n(\omega)G(\omega) \tag{5}$$

and finally, that the output is given by $$H_2(\omega)=\sum_{n=1}^{N}Y_n(\omega)*P_n(\omega) \tag{6}$$

since multiplication in the time domain corresponds to convolution in the frequency domain. A modulating signal more general than that expressed in Equation 1, with the substitution of variables shown in Equation 2, can be expressed as the complex Fourier series $$p_n(t)=\sum_{m=-\infty}^{m=+\infty}a_m e^{-j\omega_1 m(n-1)\tau}e^{j\omega_1 mt} \tag{7}$$

where the variable portion of the exponential has been separated out. Since the time function $e^{j\omega_1 mt}$ has a Fourier transform equal to the frequency function $\delta(\omega-m\omega_1)$, where $\delta(\omega)$ is the usual unit impulse function, Equation 7 can be written as the frequency function $$P_n(\omega)=\sum_{m=-\infty}^{m=+\infty}a_m e^{-j\omega_1 m(n-1)\tau}\delta(\omega-m\omega_1) \tag{8}$$

Substituting Equation 8 in Equation 6 gives $$H_2(\omega)=\sum_{n=1}^{N}\sum_{m=-\infty}^{m=+\infty}a_m e^{-j\omega_1 m(n-1)\tau}Y_n(\omega)*\delta(\omega-m\omega_1) \tag{9}$$

Using the well known relation $$J(\omega)*\delta(\omega-\alpha)=J(\omega-\alpha) \tag{10}$$

Equation 9 can be written as $$H_2(\omega)=\sum_{n=1}^{N}\sum_{m=-\infty}^{m=+\infty}a_m e^{-j\omega_1 m(n-1)\tau}Y_n(\omega-m\omega_1) \tag{11}$$

Substituting Equation 5 in Equation 11 with the appropriate substitution of variables gives $$H_2(\omega)=\sum_{n=1}^{N}\sum_{m=-\infty}^{m=+\infty}a_m e^{-j\omega_1 m(n-1)\tau}X_n(\omega-m\omega_1)G(\omega-m\omega_1) \tag{12}$$

Operating in a similar fashion on the relationship expressed by Equation 4 gives $$X_n(\omega-m\omega_1)=\sum_{r=-\infty}^{r=+\infty}a_r e^{-j\omega_1 r(n-1)\tau}H_1[\omega-(m+r)\omega_1] \tag{13}$$

The Equation 12 can now be written as $$H_2(\omega)=\sum_{n=1}^{N}\sum_{m=-\infty}^{m=+\infty}\sum_{r=-\infty}^{r=+\infty}a_m a_r e^{-j\omega_1(m+r)(n-1)\tau}H_1[\omega-(m+r)\omega_1]G(\omega-m\omega_1) \tag{14}$$

Equation 14 can be simplified by using the result that $$\sum_{n=1}^{N}e^{-j\omega_1(m+r)(n-1)\tau}=N \tag{15}$$

when $(m+r)=kN$, where $k$ is an integer, and that the left hand expression is zero for all other integer values of $(m+r)$. The first summation can therefore be carried out in Equation 14 to give $$H_2(\omega)=N\sum_{k=-\infty}^{k=+\infty}\sum_{m=-\infty}^{m=+\infty}a_m a_{kN-m}H_1(\omega-kN\omega_1)G(\omega-m\omega_1) \tag{16}$$

While Equation 16 is an involved expression for arbitrary modulating signals, it reduces to a simple form for sinusoidal modulating signals. With this in mind we can write the $a$'s as follows from Equation 1:

$$a_1=\frac{1}{2j}Ae^{j\theta}$$

$$a_{-1}=-\frac{1}{2j}Ae^{-j\theta} \tag{17}$$

All other $a$ terms must be zero since only two terms of the complex Fourier expansion are required to represent a sinusoid. Furthermore, since the only nonzero terms in the sum in (16) are those for which $m=\pm1$ and $(kN-m)=\pm1$, the only value of $k$ which yields a nonzero contribution is for $k$ equal to zero. Making the appropriate substitutions for $a$'s in Equation 16 gives $$H_2(\omega)=N\left[\frac{A^2}{4}H_1(\omega)G(\omega-\omega_1)+\frac{A^2}{4}H_1(\omega)G(\omega+\omega_1)\right]$$

$$=\frac{NA^2}{4}H_1(\omega)[G(\omega-\omega_1)+G(\omega+\omega_1)] \tag{18}$$

and hence $$T(\omega)=\frac{H_2(\omega)}{H_1(\omega)}=\frac{NA^2}{4}[G(\omega-\omega_1)+G(\omega+\omega_1)] \tag{19}$$

Equation 19 will be recognized as describing a frequency shift of the transfer function $G(\omega)$ by the amount of the modulating frequency $\omega_1$.

It can be easily shown that if $p(t)$ is some arbitrary periodic function, the transfer function of the overall network can be represented by the transfer function $G(\omega)$ of the elementary networks 14, 15, . . . 16 transposed in frequency and centered around each of the frequency components of $p(t)$. This result is strictly true when $M<N/2$, where $M\omega_1$ is the highest harmonic of the fundamental radian frequency $\omega_1$ present in $p(t)$ and N is the total number of elementary networks. This relationship, however, remains approximately true even when $M>N/2$.

$H_1(\omega)$ and $H_2(\omega)$ may also be interpreted to correspond to the transforms of the voltage and current, respectively, at a single port, and all of the above relations will still hold true. The ratio of $H_2(\omega)$ and $H_1(\omega)$ will, of course, no longer be a transfer function but will represent a driving point admittance. Thus, admittances may also be synthesized having the same frequency characteristics as the transfer functions described above. One form of such a network is shown in FIG. 5 and will be hereinafter described.

In FIGS. 2 and 3 there is disclosed two simple networks which may be useful to provide the transfer function $G(\omega)$ for networks 14 through 16 in FIG. 1. FIG. 2 discloses a simple four-terminal network including a resistance 26 in a series arm, and a capacitor 27 in a shunt arm. The circuit of FIG. 2 may be considered an elementary low-pass filter, and has a transmission characteristic such as that disclosed in FIG. 2A. At zero and low frequencies, the transfer function $G(\omega)$ of the network of FIG. 2 is at a relatively high value and, as frequency is increased, this transfer function gradually decreases and becomes negligible in the higher frequency ranges.

Assuming that the function $p(t)$ provided by modulating signal source 22 in FIG. 1 is a simple sine wave having a frequency $\omega_1$, the overall transfer function of the circuit of FIG. 1 will then have the form shown graphically in FIG. 2B. This characteristic is essentially that of a band-pass filter and may be constructed by shifting the characteristic of FIG. 2A from zero frequency to the frequency $\omega_1$, and by providing the mirror image of this characteristic on the opposite side of $\omega_1$. In effect then, the circuit of FIG. 1 serves to translate a low-pass characteristic $G(\omega)$ into a band-pass characteristic $T(\omega)$.

It is well known that band-pass characteristics such as those shown in FIG. 2B, when formed with simple passive circuit elements, require the use of inductive elements to take advantage of resonance effects. If the frequency $\omega_1$ is of a low value, less than 100 cycles per second, for example, the inductive elements required to generate this characteristic would be prohibitively large, cumbersome and expensive. Thus, the combination of the present invention serves to synthesize transmission characteristics which are otherwise difficult, or even impossible, to obtain.

The band-width of this filter characteristic may be easily controlled by the simple expedient of arranging the values of resistor 26 and capacitor 27 in the circuit of FIG. 2 to provide the corresponding characteristic for the elementary network.

In FIG. 3 there is shown a second alternative for the elementary networks 14 through 16 in FIG. 1. FIG. 3 discloses a simple four-terminal network including capacitors 28 and 61 and resistors 29 and 60. As is well known, the circuit of FIG. 3 provides a simple high-pass filter with a transfer function similar to that shown in FIG. 3A. At zero and low frequencies, little or none of the input signal impressed on the circuit appears at the output. As the frequency is increased, the output increases until the transfer function of the network approaches a constant. At substantially higher frequencies, the characteristic of FIG. 3A again tapers off to zero due to the low-pass section comprising resistor 60 and capacitor 61. This latter section is necessary to prevent undue distortion by the negative frequency portion of the characteristic of Equation 19. Again, assuming that the modulating signal $p(t)$ is a simple sine wave having a frequency of $\omega_1$, the over-all transfer function of the circiut of FIG. 1 will be similar to that disclosed in FIG. 3B. The characteristic of FIG. 3B is that of a band-elimination filter centered on the frequency $\omega_1$, and may be constructed from the characteristic of FIG. 3A as before. Again, the shape of this characteristic may be easily modified by modifying the passive elements in the elementary network of FIG. 3.

As has been discussed with reference to FIGS. 2 and 3, the mid-band frequency of the over-all transmission characteristics illustrated in FIGS. 2B and 3B is equal to the frequency of the modulating signal from source 22. Signal source 22 may therefore comprise a simple oscillator having a frequency $\omega_1$. Moreover, the frequency of this oscillator may be made manually or electronically variable, thus to change the modulating frequency and to shift the mid-band frequency of the characteristics of FIGS. 2B and 3B. It is therefore apparent that the arrangement of FIG. 1 not only provides a transfer function which is easily synthesized but, moreover, provides a transfer function which can be automatically varied and hence be useful for such applications as automatic frequency tracking.

In FIG. 4 there is shown an elementary network similar to that shown in FIG. 2 and comprises a resistor 26 in a series arm and a capacitor 27 in the shunt arm. The transmission characteristic of the network of FIG. 4 is illustrated in FIG. 4A and is seen to correspond to that of FIG. 2A, except that the frequency scale has been substantially compressed. Assuming now that the function $p(t)$ is no longer merely a single sine wave but is a combination or sum of a plurality of sine waves having frequencies of $\omega_1$, $\omega_2$, $\omega_3$ and $\omega_4$. The overall transmission characteristic of the circuit of FIG. 1 under this condition will be that disclosed in FIG. 4B. It can be seen that a plurality of band-pass characteristics are combined. One centered at a frequency $\omega_1$, another frequency of $\omega_2$, the third frequency $\omega_3$ and the fourth frequency $\omega_4$. Moreover, the maximum amplitude of the transfer function at each of these frequencies may be separately controlled by adjusting the amplitudes of the corresponding components in the modulating signal. Thus, as illustrated in FIG. 4B, the modulating component at frequency $\omega_4$ has the largest amplitude, while the modulating component at frequency $\omega_2$ has the smallest.

In FIG. 5 there is shown another embodiment of the present invention which is useful in synthesizing driving-point admittances, rather than transfer functions. That is, the admittance characteristic between terminals 30 and 31 can be synthesized in much the same manner as the transfer function between terminals 10 and 21 in FIG. 1.

In FIG. 5 a plurality of N elementary two-port networks 32, 33, . . . 34 are provided each having a transfer function $G(\omega)$. In special cases the two-port network may contain only a single impedance, in which case the transfer function becomes a driving-point function. Input and output modulators are connected respectively between the input and output ports of the two-port networks 32 through 34 and terminal 30.

Modulators 35 and 36 produce at their output a signal proportional to the instantaneous product of the signal at their respective input terminals and a modulating signal derived from source 37. Modulators 35 are arranged to accept signals from terminal 30 and deliver the product to the input of one of the two-port networks 32 through 34. The modulators 36 accept the output signal from one of the two-port networks 32 through 34 and deliver the product to terminal 30. It can be seen that each of the modulating circuits 35 and 36 is unidirectional. The modulating signals for each of modulators 35 and 36 are derived from source 37. Each of the frequency components for the successive pairs of input and output modulators is displaced in time in delay networks 38 through 40 by $T/N$ where T, as before, is the period of $p(t)$.

The operation of the circuit of FIG. 5 is in many respects identical to that of FIG. 1 and can be described by similar equations. Thus the driving-point admittance of the circuit between terminals 30 and 31 in FIG. 5 can be written as $$Y_{in}(\omega)=\frac{I_{in}(\omega)}{E_{in}(\omega)}=\frac{NA^2}{4}[G(\omega-\omega_1)+G(\omega+\omega_1)] \quad (20)$$

where $p(t)$ is given by $$p(t)=A\sin(\omega_1 t+\theta) \quad (21)$$

Equation 20 assumes that the input to the input modulators 35 and output from the output modulators 36 are respectively voltages and currents. Hence it is required that the input impedance of modulators 35 and output impedance of modulators 36 be high. The curves of 2B, 3B and 4B can be interpreted as admittance functions rather than transfer functions when the circuit of FIG. 5 is considered.

In FIG. 6 there is shown one common type of product modulator useful in the circuits of FIGS. 1 and 5. FIG. 6 discloses a pentagrid tube 50 having two control grids 51 and 52. Within a limited range of operation, the output voltage $e_0$ of the pentagrid tube is proportional to the product of the input voltage $e_1$ to grid 51 and input voltage $e_2$ to grid 52.

Many other forms of product modulators are equally suitable for this purpose and, since they are well-known to those skilled in the art, will not be further described here.

In the embodiment of the invention disclosed in FIG. 5, two product modulators, for example, 35 and 36, are placed back-to-back when the two-port networks 32 through 34 contain a single impedance. It is apparent that some form of isolation must be provided between their respective inputs and outputs to prevent direct interaction therebetween. Buffer stages of amplification, designed in accordance with well-known circuit techniques, will provide the necessary isolation.

It is to be understood that the above-described arrangements are merely illustrative of the numerous and varied other arrangements which may comprise applications of the principles of the invention. Such other arrangements can readily be devised by those skilled in the art without departing from the spirit or scope of this invention.

What is claimed is:

1. A time-varying network comprising at least three input modulators, at least three output modulators, a two-port linear transducer connected between each of said input modulators and a corresponding one of said output modulators, a source of modulating signals, means for delaying modulating signals from said source in successive equal time increments, means for applying each of said successively delayed modulating signals to a different input modulator and corresponding output modulator, means for applying an input signal to each of said input modulators and means for combining the outputs from all of said output modulators.

2. In combination, at least three two-port linear transducers, individual input modulating means for delivering a modulated signal to each of said transducers, individual output modulating means for accepting signals to be modulated from each of said transducers, a source of modulating signals, means for delaying said modulating signals in fixed equal increments, means for applying modulating signals with different delay increments to each of said input modulating means and to the corresponding output modulating means, means for applying an input signal to said input modulating means, and means for deriving an output signal from said output modulating means.

3. The combination according to claim 2 in which said input signal and said output signal appear at different sets of terminals.

4. The combination according to claim 3 in which said input signal and said output signal are both voltage functions.

5. The combination according to claim 3 in which said input signal and said output signal are both current functions.

6. The combination according to claim 2 in which said input signal and said output signal appear at the same set of terminals, one of said signals being a voltage function and the other of said signals being a current function.

7. A time-varying network comprising a plurality of input modulators, an equal plurality of output modulators, an equal plurality of two-port, linear transducers, the output of each of said input modulators and the input of a corresponding one of said output modulators being coupled to one of said transducers, a source of incrementally time-displaced modulating signals, means for applying modulating signals with different time displacements to each of said input modulators and to the corresponding output modulator, and means for utilizing impedance functions appearing across the combination of input and output modulators and transducers.

8. The time-varying network according to claim 7 in which said source of modulating signals includes a single sine wave signal generator.

9. The time-varying network according to claim 7 in which said source of modulating signals includes a plurality of sine wave signal generators operating at different frequencies.

10. In combination, at least three signal transmission networks, an input product modulator associated with each of said networks and arranged to deliver a modulated signal to the associated network, an output product modulator associated with each of said networks and arranged to accept signals to be modulated from the associated network, a source of modulating signals, a plurality of serially connected delay circuits, means for applying said modulating signal to a first one of said delay circuits, means for applying the output of each of said delay networks to a different one of said input product modulators and to the output product modulator associated with the same network, means for applying an input signal to all of said input product modulators, and means for deriving an output signal from said output product modulators.

11. The combination according to claim 10 in which each of said signal transmission networks comprises a low-pass filter structure.

12. The combination according to claim 10 in which each of said signal transmission networks comprises a high-pass filter structure.

13. A time-varying two-port transducer comprising N input product modulators and N output product modulators, where N is greater than two, a two-port linear transducer connected between each of said input modulators and a corresponding one of said output modulators, a source of modulating signals, (N−1) delay networks connected in series to the output of said source of modulating signals, means for connecting the successive terminals of said delay networks to individual ones of said input and output product modulators, means for applying an input signal to all of said input modulators to be modulated therein, and means for combining the outputs of said output modulators.

14. The time-varying two-port transducer according to claim 13 wherein said source of modulating signals includes a single sine wave signal source.

15. The time varying two-port transducer according to claim 13 wherein said source of modulating signals includes M sine wave signal generators operating at different frequencies, where N is greater than 2M.

16. A time-varying single-port network comprising N input product modulators and N output product modulators, said modulators arranged in pairs with the input terminals of each input modulator and the output terminals of each output modulator coupled to a common point, a two-port linear network coupled between the output terminals of each of said input modulators and the input terminals of the paired output modulator, a source of modulating signals, means for incrementally delaying said modulating signals to produce N different signals successive ones of which are displaced in time by T/N, where T is the period of said modulating signal, means for applying each of said delayed signals to a different one of said input modulators and to the paired output modulator, and means for utilizing the impedance function appearing between said common point and the uncoupled terminals of said two-port networks.

17. The time varying single-port transducer according to claim 16 in which each of said two-port networks comprises a single shunt impedance element.

18. The time varying single port transducer according to claim 16 in which each of said two-port networks includes series and shunt impedance elements.

References Cited in the file of this patent

UNITED STATES PATENTS

| | | |
|---|---|---|
| 2,297,451 | Bendel | Sept. 29, 1942 |
| 2,909,656 | Meyer | Oct. 20, 1959 |
| 2,914,670 | Boff | Nov. 24, 1959 |